March 14, 1967     J. A. GIORDMAINE     3,309,526
OPTICAL PARAMETRIC AMPLIFIER AND OSCILLATOR WITH ISOTROPIC
CRYSTAL, PHASE MATCHING AND LOWER FREQUENCY PUMP
Filed Dec. 14, 1965

INVENTOR
*J. A. GIORDMAINE*
BY
*ATTORNEY*

United States Patent Office 3,309,526
Patented Mar. 14, 1967

3,309,526
OPTICAL PARAMETRIC AMPLIFIER AND OSCILLATOR WITH ISOTROPIC CRYSTAL, PHASE MATCHING AND LOWER FREQUENCY PUMP
Joseph A. Giordmaine, Summit, N.J., assignor to Bell Telephone Laboratories, Incorporated, New York, N.Y., a corporation of New York
Filed Dec. 14, 1965, Ser. No. 513,704
7 Claims. (Cl. 307—88.3)

This invention relates to optical parametric devices and, more particularly, to such devices utilizing isotropic optical media.

Heretofore, optical parametric devices for use as oscillators, amplifiers, or harmonic generators have employed crystals which exhibit birefringence or are optically anisotropic. This quality of birefringence has heretofore been generally believed to be necessary in order that phase matching among the pump, signal, and idler light waves can be achieved, a condition for parametric operation that has heretofore generally been believed to be necessary. In addition, in accordance with the requirements for parametric operation, the light wave pump frequency, in general, has to be greater than that of either the signal or idler wave, and equal to the sum of the two. As a consequence, a separate pump source is usually necessary, and, where a harmonic generator crystal is used to produce the pump energy, two separate crystals are generally necessary, which produces problems of alignment.

The present invention is directed to the alleviation of these problems, and, in addition, making available for use in parametric devices a large class of crystals which have, heretofore, not been useable as parametric devices because they do not possess the characteristics of anisotropy or birefringence.

The invention is based upon the realization that pumping within a crystal may be achieved by other means than light rays. When a light beam is directed into an isotropic crystal it simply propagates therethrough and cannot be phase matched to the other waves within the crystal, the sum of whose frequencies, in the usual parametric process, equals the frequency of the incident light. However, this light beam gives rise to a traveling wave of index of refraction change within the crystal at twice the frequency of the light wave. The propagation vector of this traveling wave of refractive index change differs from that of a light wave at the same frequency, thereby permitting phase matching among the traveling wave of index of refraction change and the signal and idler waves within the material. The power required for amplification in this manner is substantially less than the threshold power required for non-phase matching amplification of the type shown in the copending United States patent application Ser. No. 480,986, filed Aug. 19, 1965, of A. Ashkin, now United States Patent 3,267,385, issued Aug. 16, 1966.

In a first illustrative embodiment of the invention, a light wave of frequency $f_1$ from a suitable source is introduced into an isotropic crystal of suitable material, such as, for example, gallium phosphide (GaP). The traveling wave of index of refraction change within the material induces light waves of frequencies $f_2$ and $f_3$, which are related to $f_1$ by $$2f_1 = f_2 + f_3 \quad (1)$$

A cavity resonator is disposed relative to the crystal at an angle corresponding to the direction of travel of either $f_2$ or $f_3$, whichever it is desired to use, and tuned to that frequency so that the output of the resonator is a light ray at either frequency $f_2$ or $f_3$.

In a second illustrative embodiment of the invention, a light wave of frequency $f_1$ and a light wave of frequency $f_2$ are both introduced into an isotropic crystal from suitable sources and at an angle to each other. The traveling wave of index of refraction change set up in the crystal by the light ray of frequency $f_1$ generates an idler wave of frequency $f_3$ which is equal to the difference between $2f_1$ and $f_2$, with the consequence that $f_2$ is amplified, the output of the crystal being an amplified light ray of frequency $f_2$.

It is one feature of the present invention that the crystal used for parametric amplification or oscillation is an isotropic crystal.

It is another feature of the present invention that the energy for parametric operation is derived from a light ray whose frequency is equal to one-half the sum of the signal and idler waves, the energy itself being a traveling wave of index of refraction change at twice the frequency of the aforementioned light ray.

These and other features of the present invention will be more readily apparent from the following detailed description, read in conjunction with the accompanying drawings, in which.

Figure 1:
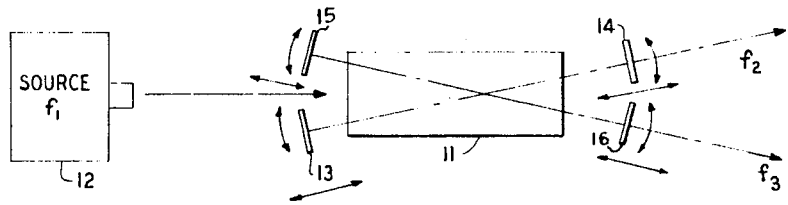
FIG. 1 is a diagrammatic view of a first illustrative embodiment of the invention.

In FIG. 1 there is shown an illustrative embodiment of the invention which operates as a parametric generator of signal frequencies. The arrangement of FIG. 1 comprises an isotropic crystal 11 of suitable material, such as gallium phosphide (GaP) or gallium arsenide (GaAs) into which is directed light energy of frequency $f_1$ from a suitable coherent light source 12. As discussed in the foregoing, the light energy $f_1$ produces in crystal 11 a traveling polarization wave $P_+$ at a frequency $2f_1$ along with its associated electric field $E_+$. In a non-linear material such as GaAs, the polarization wave $P_+$ is proportional to the square of the electric field of the incident energy, that is $$P_+ \sim E_1^2 \quad (2)$$

Figure 2:
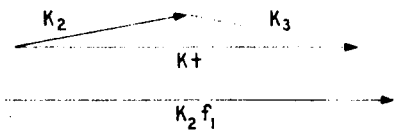
FIG. 2 is a vector diagram of the wave energy present in the operation of the arrangement of FIG. 1.

The electric field $E_+$ associated with the polarization wave produces in crystal 11 a traveling wave of index of refraction change $\Delta n$ that is directly proportional to $E_+$. As a consequence, there are generated within crystal 11 at least a pair of waves of frequencies $f_2$ and $f_3$ which satisfy the relationship of Equation 1. For parametric amplification, in general it is not only necessary that this frequency relationship be satisfied, but it is also, for optimum results, necessary that these frequencies be phase matched to the pumping energy, i.e., the sum of their propagation vectors $k_2$ and $k_3$ must equal the propagation vector of the pumping energy. Ordinarily, this last condition cannot be met in an isotropic crystal, either linear or non-linear, but with the present invention, such matching is possible. If a light wave of frequency $2f_1$ were propagating through crystal 11, its propagation constant vector $k_{2f_1}$ would be as shown in FIG. 2, and the vector sum of the propagation vectors $k_2$ and $k_3$ of the generated waves is less than $k_{2f_1}$. As a consequence, the phase matching condition for parametric operation is not met. In the present invention, the polarization wave has a propagation constant $k_+$, as does its associated electric field $E_+$ and the index of refraction wave $\Delta n$, which is sufficiently different from $k_{2f_1}$ to permit phase matching, as is shown in FIG. 2.

As pointed out in the foregoing, the conditions for parametric operation are met in the arrangement of FIG. 1 and useful outputs at both frequencies $f_2$ and $f_3$ are available. In FIG. 1, a resonator defined by reflecting members 13 and 14 is utilized to resonate frequency $f_2$, thereby enhancing the output frequency $f_2$. If desired, a second resonator for enhancing $f_3$ may also be used advantageously. Such a resonator is shown defined by reflecting members 15 and 16.

As an example of the frequencies involved, $f_1$ may be $2.830 \times 10^{14}$ c.p.s. (1.06 microns). The signal $f_2$ may be $3.158 \times 10^{14}$ c.p.s. (0.95 micron) in which case the idler $f_3$ will be $2.502 \times 10^{14}$ c.p.s. (1.20 microns). It should be noted that the arrangement of FIG. 1 makes possible the generation of a signal frequency that is greater than the frequency of the energy source, which is, of course, a highly advantageous phenomenon.

The arrangement of FIG. 1 is readily tuneable so that the output frequency or frequencies can be varied over a wide range. The principles of tuning are much the same as those set out in the copending United States patent application Ser. No. 224,294 of A. Ashkin, filed Sept. 18, 1962, now Patent No. 3,234,474. Briefly, the output frequency of the arrangement of FIG. 1 is varied by rotating the axis of the resonator formed by members 13 and 14 relative to the direction of propagation of the traveling polarization wave $P_+$, as indicated by the arrows. At the same time, members 13 and 14 are moved in translation, as indicated by the arrows, to tune the resonator to the new frequency. As pointed out in the Ashkin application, such an operation results in a different frequency $f_2$ being enhanced. However, there will always be generated at the same time an idler wave $f_3$ whose frequency and propagation constant satisfy the necessary conditions for parametric operation. Where it is desired to utilize both signal and idler wave resonators, both signal and idler resonators must be made adjustable as to resonant frequency and angular orientation. Tuning may also be achieved with fixed resonators by means of temperature and electro-optic effects, as disclosed in the copending application of J. A. Giordmaine and R. C. Miller, Ser. No. 459,173, filed May 27, 1965.

Figure 3:
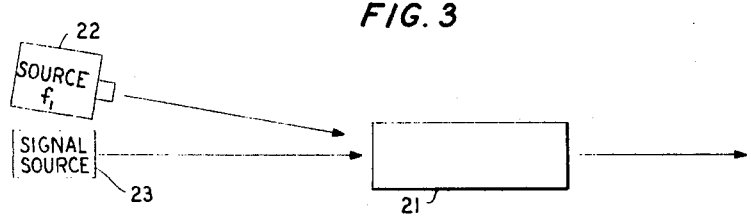
FIG. 3 is a diagrammatic view of a second illustrative embodiment of the invention.

In FIG. 3 there is shown an embodiment of the invention which functions as a parametric amplifier. The arrangement of FIG. 3 comprises an isotropic crystal 21 of suitable material such as GaP or GaAs into which is directed a coherent light beam from a suitable source 22. In addition, light waves to be amplified are directed from a suitable source 23 into the crystal at an angle to the direction of light from the source 22. As was the case in FIG. 1, there is created a traveling wave of index of refraction change whose propagation vector equals the vector sum of the signal wave $f_2$ and an internally generated idler wave $f_3$, and whose frequency is twice the frequency $f_1$ and equal to the sum of the signal and idler frequencies, $f_2$ and $f_3$. For a particular value of $f_1$ and of $f_2$, the angle between them is uniquely determined. In the operation of the arrangement of FIG. 3, this angle can be readily found by varying the angle between the input $f_1$ and $f_2$ until the output is a maximum, at which point the angle is correct. This procedure can also be followed whenever frequency $f_2$ is changed, which necessitates a different angle. The proper angle insures that the phase matching is exact.

From the foregoing, it can be seen that parametric amplification and oscillation with isotropic crystals is feasible. This means that large numbers of crystals may now be used as light amplifiers which were thought heretofore to be unworkable.

The foregoing discussion has dealt primarily with isotropic non-linear, i.e., non-centrosymmetric or piezoelectric crystals. The gain at the signal frequency $f_2$ in the arrangement of FIG. 3 is proportional to the field $E_+$, but it is also proportional to the non-linear coefficient $\chi$ of the material. This, even where the field $E_+$ is weak compared to the field of free waves in phase matched materials, i.e., birefringent or anisotropic materials, the non-linear coefficient is, in many cases, great enough to make the gain of the isotropic material comparable. As an example, the $E_+$ wave in GaAs may be 20 electrostatic units whereas the electric field in lithium metaniobate ($LiNbO_3$) may be as much as 2000 electrostatic units. However, the non-linear coefficient of GaAs is fifty times greater than that of $LiNbO_3$, hence the gains differ by only a factor of two. Other isotropic materials having even greater non-linear coefficients may, of course, be used instead of GaAs, for example.

While the invention has been shown and described with particular reference to isotropic non-linear, i.e., non-centrosymmetric or piezoelectric materials, the same principles also apply to all isotropic materials, including liquids and gases. With these latter materials, the effect is somewhat weaker inasmuch as the traveling wave of index of refraction change is a second order effect, that is, $\Delta n$ is proportional to $E_1^2$. Nonetheless, where high gain is not the principal aim, virtually any isotropic material can readily be used.

The foregoing discussion has demonstrated how an energy producing wave of a frequency less than the signal wave can be used to produce parametric amplification of the signal wave. It is also possible to use two or more input energy waves of even lesser frequencies, whose combined effects in the crystal produce the desired traveling index of refraction wave at the sum frequency of the input waves. This and various other possibilities and arrangements may readily occur to workers in the art without departing from the spirit of the invention.

What is claimed is:

1. An optical parametric device comprising an isotropic crystal, means for producing within said crystal a phase matched condition among waves of frequencies $f_2$ and $f_3$ propagating in said crystal and a traveling wave of index of refraction change in said crystal having a frequency $2f_1$ comprising means for directing energy at a frequency $f_1$ into said crystal at a power level less than the threshold power for non-phase matched amplification within said crystal, where $$f_1 = \frac{f_2 + f_3}{2}$$

and means for utilizing output radiation from said crystal at the frequency $f_2$.

2. An optical parametric device as claimed in claim 1 wherein said isotropic crystal is also non-centrosymmetric.

3. An optical parametric device as claimed in claim 1 wherein said crystal is of a class of material which includes GaAs and GaP.

4. An optical parametric amplifier comprising an isotropic crystal, means for directing electromagnetic wave energy at a frequency $f_1$ into said crystal at a power level less than the threshold power for non-phase matched amplification within said crystal, said energy giving rise to a traveling index of refraction wave of a frequency $2f_1$ in said crystal having a propagating velocity differing from that of said wave energy, means for directing signal energy at a frequency $f_2$ into said crystal at a phase matching angle to the direction of the traveling index of refraction wave, said signal energy being related to the index of refraction wave by $2f_1 = f_2 + f_3$ where $f_3$ is an idler wave generated within the crystal, and means for utilizing the amplified output of the crystal of frequency $f_2$.

5. An optical parametric device comprising an isotropic crystal, means for directing electromagnetic wave energy at a frequency $f_1$ into said crystal at a power level less than the threshold power for non-phase matched amplification within said crystal, said energy producing within said crystal a traveling wave of index of refraction change at a frequency $2f_1$, and also giving rise to sideband radiation at a frequency $f_3$ within said crystal, said sideband radiation being related to said input radiation by $$f_1 = \frac{f_2 + f_3}{2}$$

where $f_2$ is signal energy propagating in said crystal, and means defining an optical resonator resonant at the frequency $f_2$ and oriented at a phase matching angle to the traveling wave of index of refraction change.

6. An optical parametric device as claimed in claim 5, and further including means defining an optical resonator resonant at the frequency $f_3$.

7. An optical parametric device as claimed in claim 5 wherein said resonator is adjustable both as to resonant frequency and angular orientation relative to the axis of said crystal.

References Cited by the Applicant

Applied Physics Letters, vol. 6, No. 8, April 15, 1965, pp. 169–171.
Review of Modern Physics, vol. 35, 1963, p. 23.
Physical Review, vol. 127, 1962, p. 1918.
Physical Review, vol. 126, 1962, p. 1977.
Journal of Applied Physics, vol. 29, 1958, p. 1347.

ROY LAKE, *Primary Examiner.*

D. HOSTETTER, N. KAUFMAN, *Assistant Examiners.*